United States Patent
Kopetz

(10) Patent No.: US 10,285,145 B2
(45) Date of Patent: May 7, 2019

(54) METHOD FOR DETERMINISTIC WIRELESS TRANSFER OF TIME-CONTROLLED REAL-TIME MESSAGES IN A DISTRIBUTED REAL-TIME SYSTEM

(71) Applicant: FTS COMPUTERTECHNIK GMBH, Vienna (AT)

(72) Inventor: Hermann Kopetz, Baden (AT)

(73) Assignee: TTTech Computertechnik AG, Vienna (AT)

( * ) Notice: Subject to any disclaimer, the term of this patent is extended or adjusted under 35 U.S.C. 154(b) by 167 days.

(21) Appl. No.: 15/316,201

(22) PCT Filed: Jun. 8, 2015

(86) PCT No.: PCT/AT2015/050144
§ 371 (c)(1),
(2) Date: Dec. 5, 2016

(87) PCT Pub. No.: WO2015/184483
PCT Pub. Date: Dec. 10, 2015

(65) Prior Publication Data
US 2017/0156120 A1    Jun. 1, 2017

(30) Foreign Application Priority Data
Jun. 6, 2014   (AT) .............. A 50396/2014

(51) Int. Cl.
*H04W 56/00*    (2009.01)
*H04W 84/12*    (2009.01)
*H04W 88/08*    (2009.01)

(52) U.S. Cl.
CPC ......... *H04W 56/001* (2013.01); *H04W 56/00* (2013.01); *H04W 84/12* (2013.01); *H04W 88/08* (2013.01)

(58) Field of Classification Search
CPC ..................... H04W 56/0001; H04W 84/12
See application file for complete search history.

(56) References Cited

U.S. PATENT DOCUMENTS 5,694,542 A    12/1997 Kopetz
9,668,030 B2 *  5/2017 Gupta ............... G06Q 30/0241
(Continued)

FOREIGN PATENT DOCUMENTS

GB    2443862 A    5/2008

OTHER PUBLICATIONS

Search Report for Austrian Application No. A 50396/2014 dated Mar. 16, 2015.

(Continued)

*Primary Examiner* — Zhiren Qin
(74) *Attorney, Agent, or Firm* — Eversheds Sutherland (US) LLP

(57) ABSTRACT

The invention relates to a method for deterministic wireless transfer of time-triggered real-time messages in a distributed real-time system, which real-time system comprises a plurality of node computers and one or more base stations, which are arranged in an arena, wherein all node computers and base stations have a global time, wherein one or more real-time message sequences are periodically transferred in the arena, wherein a real-time message sequence consists of a time-triggered header message with variable length and a sequence of one or more time-triggered real-time messages with a priori known length, and wherein, at an a priori determined transmission time, the software of a T-node issues, to a communication controller thereof, the command to send the header message, and wherein the communication controller of the T-node starts to send the header message as soon as no activity is determined in the arena during an IFS, and wherein the sending of the header message is aborted at (Continued)

Figure 1:
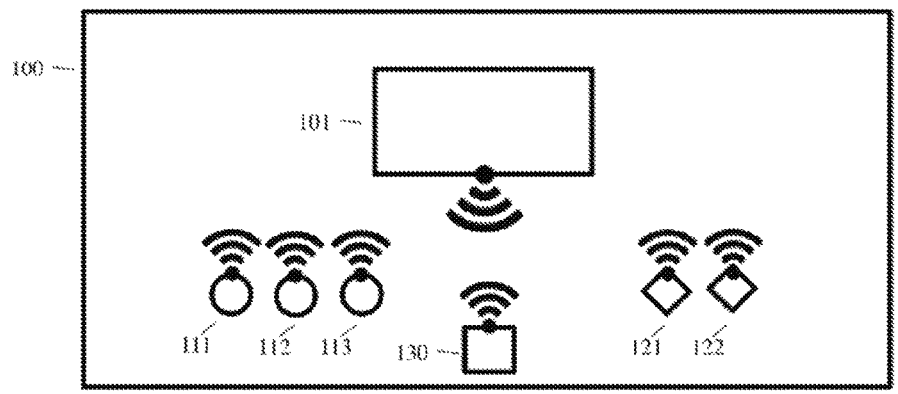

an a priori determined time-triggered abort time of the T-node, and wherein, in a command interval before the abort time of the header message, the software of the computer node that has to send the first real-time message of the real-time message sequence issues, to the communication controller thereof, the command to send the first real-time message of the real-time message sequence, and wherein, in the command interval before the termination of the first real-time message, the software of the computer node that has to send the following real-time message of the real-time message sequence issues, to the communication controller thereof, the command to send the following real-time message, and wherein this process is repeated until all real-time messages of a real-time message sequence have been sent.

13 Claims, 2 Drawing Sheets

(56) References Cited

U.S. PATENT DOCUMENTS

| 2004/0171407 | A1* | 9/2004 | Ninomiya | H04W 16/14 |
| | | | | 455/561 |
| 2007/0165593 | A1 | 7/2007 | Hundal et al. | |
| 2008/0273518 | A1 | 11/2008 | Pratt et al. | |
| 2011/0014866 | A1 | 1/2011 | Sultenfuss et al. | |
| 2012/0275317 | A1* | 11/2012 | Geva | H04J 3/0667 |
| | | | | 370/250 |
| 2013/0183905 | A1 | 7/2013 | Richardson et al. | |

OTHER PUBLICATIONS

Search Report for PCT Application No. PCT/AT2015/050144 dated Sep. 25, 2015.

* cited by examiner

METHOD FOR DETERMINISTIC WIRELESS TRANSFER OF TIME-CONTROLLED REAL-TIME MESSAGES IN A DISTRIBUTED REAL-TIME SYSTEM

The invention relates to a method for deterministic wireless transfer of time-triggered real-time messages in a distributed real-time system, which real-time system comprises a plurality of node computers and one or more base stations, which are arranged in an arena, wherein all node computers and base stations have a global time.

The invention also relates to a T-node for wireless transfer of time-triggered messages in a distributed real-time system, which real-time system comprises a plurality of node computers and one or more base stations, which are arranged in an arena.

Lastly, the invention also relates to a real-time system, in particular a distributed real-time system, comprising a plurality of node computers and one or more base stations, which are arranged in an arena, for carrying out a method of this type, wherein preferably all node computers and base stations have a global time.

In control engineering applications where a control circuit between a controller and a route is closed by means of a wireless data exchange, deterministic behaviour of the communication system is of particular importance.

The existing protocols for wireless data transfer, such as the widespread WiFi protocol [6], use a frequency band that can be used simultaneously by many devices without licence. In accordance with the WiFi protocol, in order to minimise the mutual influencing of the devices, the sending of a message by a device is only started when a transmission channel is unoccupied. There are thus no unforeseeable delays in the message transport.

The object of the invention is to specify a solution as to how real-time data can be transferred wirelessly and deterministically in a distributed real-time system.

This object is achieved with a method of the type described in the introduction in that, in accordance with the invention, one or more real-time message sequences are periodically transferred in the arena, wherein a real-time message sequence consists of a time-triggered header message with variable length and a sequence of one or more time-triggered real-time messages with a priori known length, and wherein, at an a priori determined transmission time, the software of a T-node issues, to the communication controller thereof, the command to send the header message, and wherein the communication controller of the T-node starts to send the header message as soon as no activity is determined in the arena during an IFS, and wherein the sending of the header message is aborted at an a priori determined time-triggered abort time of the T-node, and wherein, in a command interval before the abort time of the header message, the software of the computer node that has to send the first real-time message of the real-time message sequence issues, to the communication controller thereof, the command to send the first real-time message of the real-time message sequence, and wherein, in the command interval before the termination of the first real-time message, the software of the computer node that has to send the following real-time message of the real-time message sequence issues, to the communication controller thereof, the command to send the following real-time message, and wherein this process is repeated until all real-time messages of a real-time message sequence have been sent.

The present invention describes a new method for deterministic wireless transfer of time-triggered messages between a plurality of mobile and/or stationary node computers which are situated in a spatially limited region, i.e. the arena.

The present new method solves this problem in that a specific node computer, or a T-node (short for time node), which defines the global time, periodically produces a global synchronisation event in the arena, which can be used by all node computers in order to synchronise the local clocks of the node computers with the global time. On the basis of this global time, the node computers can send the real-time messages in accordance with an a priori created time schedule in the form of a periodic real-time message sequence. It is advantageous to synchronise the T-node with an external time signal, for example the GPS time, externally.

In such a T-node there is preferably arranged a chipset for wireless transfer, and the physical connection between the chipset and the antenna of the T-node can be interrupted by a time-triggered switch. A GPS signal receiver is preferably contained in the T-node in order to receive the GPS time.

The proposed method is not anticipated in any of the search patents [1-5] or the identified specialist literature.

The present invention describes a new method for deterministic wireless transfer of time-triggered messages between a plurality of mobile or stationary node computers, which are situated in a spatially limited region, and one or more stationary base stations. In order to ensure that the real-time data can be transferred at a priori known times, a variable header message is sent by a specific node computer (T-node), which header message has the function of preventing the sending in the arena of messages which are not yet complete at the a priori known time of the scheduled start of the first real-time message of a real-time message sequence.

Advantageous embodiments of the method and real-time system according to the invention, which can be provided individually or in any combination, are specified hereinafter:
  a real-time message appears multiple times in a real-time message sequence;
  the length of the header message is longer than the longest application message that is to be transported by the communication controller;
  the transfer period for the entire header message is longer than the time interval between the start command for sending the header message (301) and the abort time (305), at which the sending of the header message is aborted;
  the IFS between every two messages of a real-time message sequence has the smallest value supported by the protocol;
  a node computer uses the known time of arrival of the first real-time message of the real-time message sequence for synchronisation of its local clock;
  the first real-time message of the real-time message sequence is a beacon message of the network;
  the T-node and the base stations are synchronised externally;
  the T-node and the base stations are synchronised via a TTEthernet system;
  the wireless data channel is provided in accordance with IEEE Standard 802.11 (WiFi).

In the wired TTP protocol, it is assumed that all correct node computers observe the a priori created time schedule. This assumption may not be realistic in an arena, in which messages are transferred wirelessly.

In an arena, node computers can thus be provided or node computers are provided which are not involved in the real-time data transfer, but which observe the specification of the wireless standard, in particular the WiFi standard.

The nodes involved in the real-time data transfer are co-operative in accordance with the predefined time schedule, but the other nodes provided in the arena are not aware of any time schedule and therefore cannot be co-operative.

In accordance with one aspect of the invention, a method is disclosed as to how the non-co-operative nodes, which nevertheless follow the wireless protocol, in particular the WiFi protocol, can be forced not to send messages, in particular interfering messages, during the sending of the real-time message sequence. This is achieved preferably on the one hand by the sending of the header message and/or on the other hand by the selection of the IFS.

In the following section, new terms will be explained which are used in the detailed description of the invention and go beyond the standard terms in real-time processing, as are used for example in the textbook [7].

The space in which the distributed node computers are located, which exchange data with the base stations via a wireless connection, is referred to as an arena. A message is referred to as a real-time message when it contains data of which the temporal validity [7] is limited. A real-time message is time-triggered when the time of transmission of the real-time message is determined by the progression of the global time. The time schedule defining the times of the transmission of the time-triggered real-time messages thus determines the position of the real-time messages on the time axis.

The logic of many conventional communication protocols is provided in highly integrated semiconductor components, which are referred to as chipsets. A widespread protocol for wireless data transfer is the WiFi protocol standardised by the IEEE under the name IEEE 892.11. There are a large number of chipsets on the market which implement the WiFi protocol.

The WiFi protocol operates in accordance with principle of the Carrier Sense Multiple Access Collision Avoidance method, or CSMA/CA for short. In the CSMA/CA method, a node computer may only send a message when the transfer channel is unoccupied during a predefined time interval. The length of this time interval, or the Interframe Space (IFS), is used to determine the priority of the data transfer. The shorter the IFS, the higher is the priority. The shortest waiting time (highest priority), or the Minimal Interface Space (MIFS), is determined by the characteristics of the physical transfer method, the size of the arena, and the computing power of the communication controller. The MIFS is specified in the protocol specification.

A real-time message sequence is understood to mean a chaining of time-triggered real-time messages which are sent by different computer nodes in accordance with an a priori determined periodic time schedule. The periodic time schedule specifies the recurring times at which the sending of a time-triggered real-time message starts. In accordance with the invention, a real-time message sequence consists of a header message of variable length and a sequence of time-triggered real-time messages of known constant length, wherein the IFS between two real-time messages has the smallest value supported by the protocol.

Figure 3:
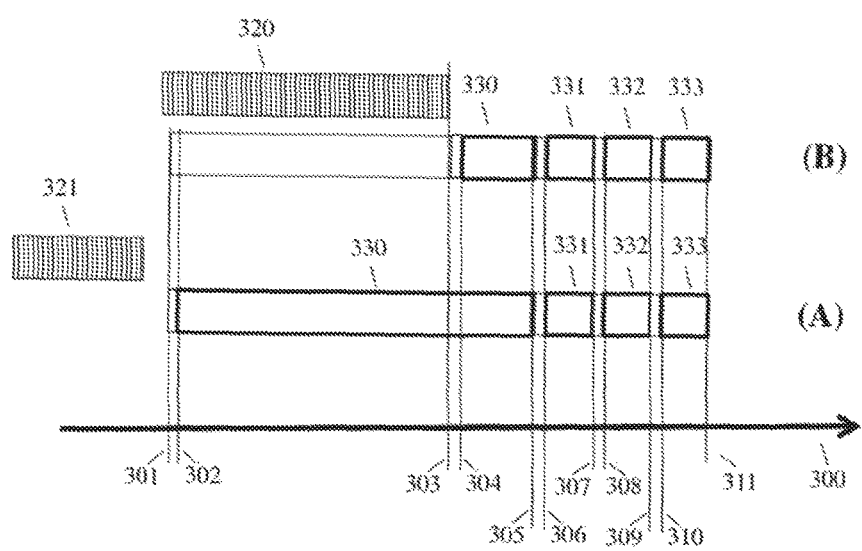

The command interval is the interval before the sending of a real-time message, during which the software of the node computer must issue the command to the communication controller to send the following real-time message of the real-time message sequence. The CSMA/CA logic of the communication controller only initiates the sending of a message when no activity is observed in the arena during the specified IFS following the end of the previous message of the real-time message sequence As shown in FIG. 3, the command interval starts after the start of the sending of the upstream real-time message of the real-time message sequence and ends before the end of the sending of the upstream real-time message of the real-time message sequence. The command interval for sending the first real-time message of the real-time message sequence starts at the time at which it is ensured that the sending of the header message has certainly started.

Figure 2:
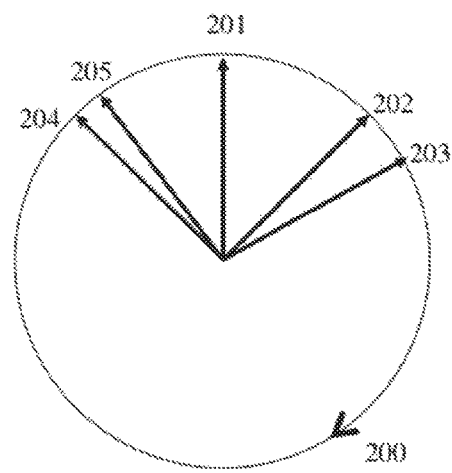

The present invention will be explained in greater detail on the basis of the drawings, in which FIG. 1 shows the structure of an arena, FIG. 2 shows the temporal procedure of the data transfer in a control circuit, and FIG. 3 shows the detailed temporal procedure of the transfer of a real-time message sequence.

One of the many possible specific embodiments of the new method will be described hereinafter on the basis of the drawings.

FIG. 1 illustrates an arena by means of a rectangle 100. In the arena 100, there is situated a node computer 101, which calculates a process model in each control loop. The node computer 101 is supplied periodically with sensor data, for example of a robot, by node computers 111, 112 and 113, i.e. the sensors, via wireless connections. The target values of the node computer 100 are wirelessly transferred periodically to node computers 121 and 122, i.e. the actuators. It is typical for this field of application of process control that the data from the sensors and the data to the actuators can be coded in few bytes. At the lower edge of FIG. 1, a T-node 130 is illustrated, which carries out the synchronisation of all node computers of the arena 100. It is advantageous when the T-node is synchronised with the external time standard, for example the GPS time FIG. 2 shows the temporal procedure of a control loop. In this image, the cyclical time illustration is used in order to highlight the periodic nature of a control loop. In FIG. 2 the time proceeds in the clockwise direction 200 and passes through the complete circle of 360 degrees during one control loop. At the time 201, the node computers 111, 112 and 113, or the sensors, detect for example the data of a robot. From the viewpoint of the application, is important that all data is detected at the same time. This simultaneity of the data detection is provided by reference to a global time, which is provided in the node computers 111, 112 and 113. At the time 202, after the pre-processing of the sensor data, the transfer of a real-time message sequence consisting of three time-triggered real-time messages from the node computers 111, 112 and 113, is started. At the time 203, the transfer of the real-time message sequence is ended. At the time 204, after the calculation of the process model, the transfer of a further real-time message sequence, which consists of two time-triggered real-time messages to the node computers 121 and 122, is started. At the time 205, the transfer of the real-time message sequence is ended. The procedure described here is repeated periodically in each control loop. The duration of 1-10 msec in order to pass through a control loop is typical for a robot application.

In terms of reliability, the real-time data from the sensors and to the actuators of a control circuit have a semantic that is different from that of the data in commercial data processing. In control engineering the temporal determinism of the data transfer is of great importance. The loss of a message is corrected by the next periodic message, such that it makes no sense to resend a corrupted or lost message at a later moment in time with the old data. However, it can be expedient to allow the same real-time message to appear multiple times in a real-time message sequence in order to mask an error in a real-time message.

FIG. 3 shows the detailed temporal procedure of the transfer of a real-time message sequence. In FIG. 3 the progression of time is illustrated on the time axis 300. Following the initialisation of the system, the time schedule of the real-time message sequence is sent to all node computers of the arena 100 by the T-node in a data message that is not time-critical, for example a message 321. The time schedule determines the periodic times (of the global time) at which a node computer has to send its time-triggered real-time message in the real-time message sequence.

The T-node defines the global time in the arena. It is advantageous when the T-node contains a receiver for the GPS signals and takes on the external time from a GPS system. The T-node 130 takes on the global time either from an external time server or starts the time counting with its initialisation. At the time 301 determined in the time schedule, the software of the T-node 130 issues, to the communication controller of the T-node, the command to send the header message of the real-time message sequence.

The header message has the function of preventing the start of the sending in the arena 100 of messages which are not yet finished at the time of the scheduled start of the first real-time message of the real-time message sequence. The content of the header message is meaningless. In accordance with the invention, the length of the header message must be greater than the longest application message which has to be transported by the communication controller. A typical value for the longest application message is the longest Ethernet message with a length of 1538 bytes. In accordance with the WiFi standard [6], the longest WiFi message is 2346 bytes. A header message with a length of 2000 bytes meets the above-mentioned requirement.

In the example of FIG. 3 a communication system having a bandwidth of 54 Mbytes/sec is assumed. In this communication system, the transfer of the header message lasts for 296 μsec and the longest Ethernet message lasts for 228 μsec.

In case (A) of FIG. 3 no message has been transferred in the arena 100 at the time 301. After the IFS <301,302>, the T-node 130 immediately starts the sending of the header message 330. Since, in accordance with the invention, the a priori determined time interval <302,305>, with a length of 280 μsec, must be shorter than the length of the header message 330 (transfer period of 296 μsec), the sending of the header message is aborted at the time 305 by the T-node 130 (at this time the sending of the header message is not yet complete). For this purpose, the T-node 130 has a time-triggered switch, which interrupts the connection from the communication controller (chipset) of the T-node 130 to the antenna of the T-node 130 at the time 305, since many chipsets do not support the temporally precise abortion of a message in the process of being transmitted.

In case (B) of FIG. 3 the transfer of the longest Ethernet message 1320 starts directly before the time 301. The transfer of this longest Ethernet message terminates at the time 303, after 228 μsec. After the IFS <303,304>, the sending of the header message 330 in the case (B) can be started only at the time 304, although the software of the T-node has already issued, to the communication controller, the command to send the header message 330 at the time 301 (as in case (A)). Also in case (B), the transfer of the header message 330 is aborted at the same time 305 as in case (A).

In accordance with the invention, the software of the node computer that has to send the first real-time message 331 issues, to the communication controller thereof, in the command interval <304,305>, the command to send the first real-time message 331. On account of the CSMA/CA logic of the communication controller, the sending of the first real-time message 331 is started only at the time 306, after the IFS <305,306>.

During the sending of the first real-time message 331 in the interval <306,307>, which is also the command interval of the second real-time message 332, the software of the node computer that has to send the second real-time message 332 issues, to the communication controller thereof, the command to send the second real-time message 332. On account of the CSMA/CA logic, the sending of the second real-time message 332 is started only at the time 308, after the IFS <307,308>.

During the sending of the second real-time message 332 in the interval <308,309>, which is also the command interval of the third real-time message 333, the software of the node computer that has to send the third real-time message 333 issues, to the communication controller thereof, the command to send the third real-time message 333. On account of the CSMA/CA logic, the sending of the third real-time message 332 is started only at the time 310, after the IFS <301,310>. The transfer of the real-time message sequence ends at the time 311.

In any WiFi network, a beacon message [6] is sent periodically by a base station. The beacon message contains the characteristic data of the network, such as the network name. In some networks, the clocks of the node computers can also be synchronised via the beacon message. In accordance with the invention, the beacon message of a WiFi network can be scheduled in the time schedule as a first real-time message of a real-time message sequence. It is advantageous when the base station that sends the beacon message and the T-node synchronise their clocks in a precise manner via a wired communication system, for example via TT Ethernet [9].

To summarise, it is determined that the time 305 at which the header message 330 is aborted by the T-node 130 represents the global synchronisation event for the entire arena. Since the length and therefore the transmission period of a real-time message is known from this time 305, the a priori known receiving time of the first (or further) real-time message of the real-time message sequence can be used as synchronisation signal in order to construct the global time in the node computers.

The present invention describes a new method for deterministic wireless transfer of time-triggered messages between a plurality of mobile and/or stationary node computers, which are situated in a spatially limited region, and one or more stationary base stations. In order to ensure that the real-time date can be transferred at a priori known times, a variable header message is introduced by a specific node computer and has the function of preventing the sending in the arena of messages which are not yet complete at the a priori known time of the scheduled start of the first real-time message of a real-time message sequence.

In the wired TTP protocol, it is assumed that all correct node computers observe the a priori created time schedule. This assumption is not realistic in an arena, in which messages are transferred wirelessly.

In an arena, node computers can thus be provided or node computers are provided which are not involved in the real-time data transfer, but which observe the specification of the wireless standard, in particular the WiFi standard.

The nodes involved in the real-time data transfer are co-operative in accordance with the predefined time schedule, but the other nodes provided in the arena are not aware of any time schedule and therefore cannot be cooperative.

In accordance with one aspect of the invention, a method is disclosed as to how the non-co-operative nodes, which nevertheless follow the wireless protocol, in particular the WiFi protocol, can be forced not to send messages, in particular interfering messages, during the sending of the real-time message sequence. This is achieved preferably on the one hand by the sending of the header message and/or on the other hand by the selection of the IFS.

CITED LITERATURE

[1] U.S. Pat. No. 8,107,390. Budampati, et al. Apparatus and method for deterministic latency-controlled communication in process control systems. Granted on Jan. 31, 2012
[2] U.S. Pat. No. 7,499,444. Bennett. Method for clock synchronization of wireless 1394 buses for nodes connected via IEEE 802.11 a/b WLAN. Granted on Mar. 3, 2009.
[3] U.S. Pat. No. 8,583,777. Boyle, et al. Method and System for providing real-time end user WIFI quality data. Granted on Mar. 27, 2012.
[4] U.S. Pat. No. 8,427,987. Stocks. System and method for time synchronized beacon enabled wireless personal area network communication. Granted on Apr. 23, 2013.
[5] U.S. Pat. No. 8,547,958. Hundal, et al. System and Method of enhancing WIFI real-time communication. Granted Oct. 1, 2013
[6] IEEE Standard 802.11. Wireless LANs. URL: standards.ieee.org.
[7] Kopetz, H. Real-Time Systems, *Design Principles for Distributed Embedded Applications*. Springer Publishing House. 2011.
[8] Hiertz, G. R. The IEEE 802.11 Universe. IEEE Communication Magazine. January 2010. pp. 62-70. IEEE Press. 2001, M., Ed. *System of Systems Engineering-Innovations for the 21st Centur.*, J. Wiley & Sons. 2009.
[9] SAE Standard AS6802 von TT Ethernet. URL: http://standards.sae.org/as6802
[10] RT-WiFi: Wei et al. Real-Time High-Speed Communication Protocol for Wireless Cyber-Physical Control Applications. Proc. of RTSS 2013.Pp. 140-149. Vancouver. IEEE Press

The invention claimed is:

1. A method for deterministic wireless transfer of time-triggered real-time messages in a distributed real-time system comprising a plurality of node computers and one or more base stations, which are arranged in an arena, wherein all of the plurality of node computers and the one or more base stations have a global time, the method comprising:
   transferring at least one real-time message sequence periodically in the arena, wherein the at least one real-time message sequence consists of a time-triggered header message with variable length and a sequence of the at least one time-triggered real-time message with a priori known length, and wherein, at an a priori determined transmission time, software of a T-node issues, to a communication controller thereof, a first command to send the time-triggered header message, and wherein the communication controller of the T-node starts to send the time-triggered header message as soon as no activity is determined in the arena during an Inter Frame Space (IFS), and wherein the sending of the time-triggered header message is aborted at an a priori determined time-triggered abort time of the T-node, and wherein, in a command interval before the abort time of the time-triggered header message, the software of a computer node that has to send a first real-time message of the at least one real-time message sequence issues, to the communication controller thereof, a second command to send the first real-time message of the at least one real-time message sequence, and wherein, in the command interval before the termination of the first real-time message, the software of the computer node that has to send a subsequent real-time message of the at least one real-time message sequence issues, to the communication controller thereof, a third command to send the subsequent real-time message, and wherein this process is repeated until all real-time messages of the at least one real-time message sequence have been sent.

2. The method of claim 1, wherein a real-time message appears multiple times in the at least one real-time message sequence.

3. The method of claim 1, wherein a length of the time-triggered header message is longer than a longest application message that is to be transported by the communication controller.

4. The method of claim 1, wherein a transfer period for an entire time-triggered header message is longer than a time interval between the first command for sending the time-triggered header message and the abort time, at which the sending of the time-triggered header message is aborted.

5. The method of claim 1, wherein the IFS between every two messages of the time-triggered real-time message sequence has a smallest value supported by a protocol.

6. The method of claim 1, wherein a node computer of the plurality of computer nodes uses a known time of arrival of the first real-time message of the at least one real-time message sequence for synchronisation of its local clock.

7. The method of claim 1, wherein the first real-time message of the at least one real-time message sequence is a beacon message of the network.

8. The method of claim 1, wherein the T-node and the one or more base stations are synchronised externally.

9. The method of claim 1, wherein the T-node and the one or more base stations are synchronised via a TTEthernet system.

10. The method of claim 1, wherein a wireless data channel is provided in accordance with IEEE Standard 802.11 (WiFi).

11. A distributed real-time system, comprising
   a plurality of node computers and one or more base stations, which are arranged in an arena, wherein all of the plurality of node computers and the one or more base stations have a global time; and
   at least one real-time message sequence that is configured to be periodically transferred in the arena, wherein the at least one real-time message sequence consists of a time-triggered header message with variable length and a sequence of the at least one time-triggered real-time message with a priori known length,
   wherein, at an a priori determined transmission time, software of a T-node is configured to issue, to a communication controller thereof, a first command to send the time-triggered header message,
   wherein the communication controller of the T-node is configured to start to send the time-triggered header message as soon as no activity is determined in the arena during an Inter Frame Space (IFS), wherein the sending of the time-triggered header message is aborted at an a priori determined time-triggered abort time of the T-node, wherein, in a command interval before the abort time of the time-triggered header message, the software of a computer node that has to send a first real-time message of the at least one real-time message sequence is configured to issue, to the communication controller thereof, a second command to send the first real-time message of the at least one real-time message sequence, wherein, in the command interval before the termination of the first real-time message, the software of the computer node that has to send a subsequent real-time message of the at least one real-time message sequence is configured to issue, to the communication controller thereof, a third command to send the subsequent real-time message, wherein this process is repeated until all real-time messages of the at least one real-time message sequence have been sent.

12. The real-time system of claim 11, wherein the plurality of node computers and the one or more base stations have a global time.

13. The real-time system of claim 11, wherein the T-node is configured for wireless transfer of time-triggered messages in the distributed real-time system, wherein a chipset for the wireless transfer is arranged in the T-node, and a physical connection between the chipset and an antenna of the T-node is configured to be interrupted by a time-triggered switch.

* * * * *